July 3, 1951
A. DEWANDRE
2,559,065
HYDRAULIC CONTROL CIRCUIT FOR ALLOWING INDEPENDENT
OR JOINT CONTROL OF A PLURALITY OF SERVOMOTORS
Filed June 12, 1948
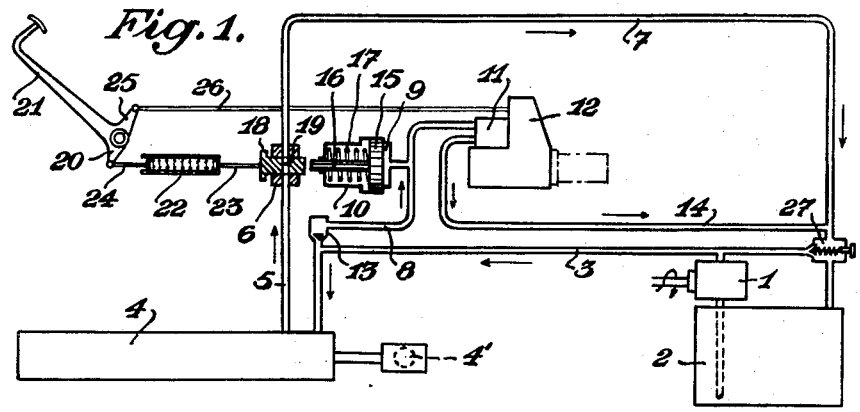
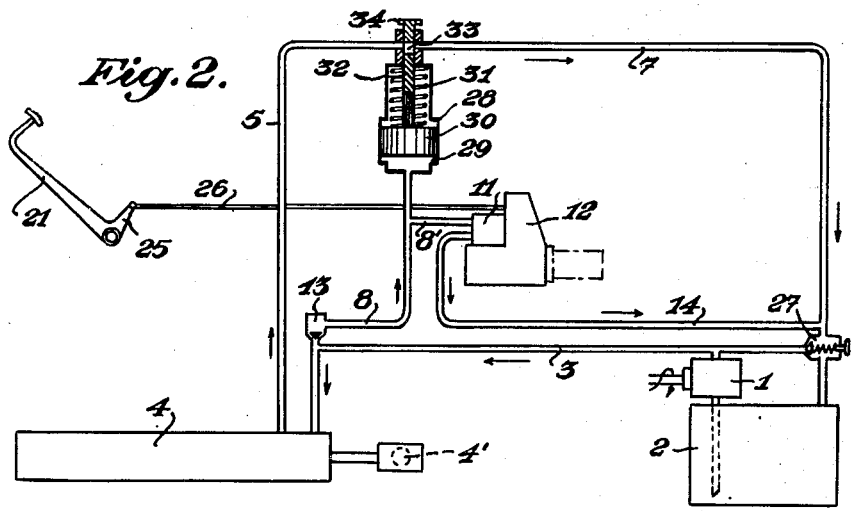
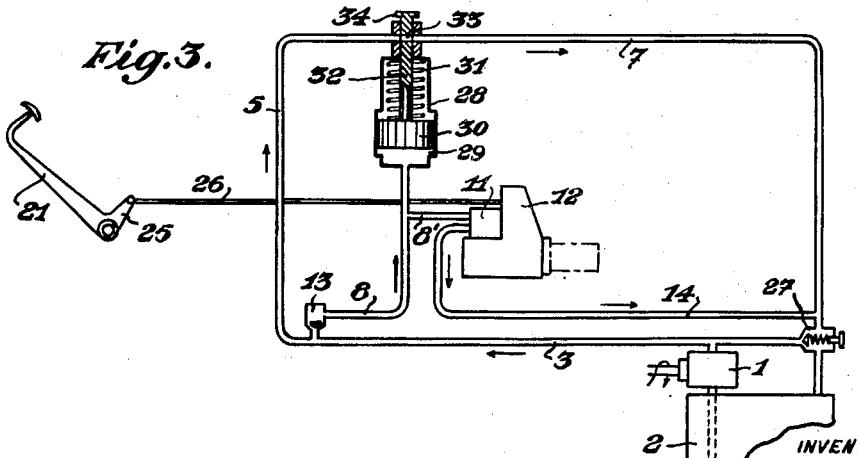
INVENTOR
ALBERT DEWANDRE
BY
Toulmin & Toulmin
ATTORNEYS / Patented July 3, 1951

2,559,065

UNITED STATES PATENT OFFICE 2,559,065

HYDRAULIC CONTROL CIRCUIT FOR ALLOWING INDEPENDENT OR JOINT CONTROL OF A PLURALITY OF SERVOMOTORS

Albert Dewandre, Brussels, Belgium, assignor to Servo-Frein Dewandre Société Anonyme, Liege, Belgium Application June 12, 1948, Serial No. 32,692
In Belgium October 20, 1947

7 Claims. (Cl. 60—51)

The invention relates to installations for the feeding, by the aid of a pump, of high-pressure hydraulic servo-motor apparatus, and it has particularly for its subject improvements in installations of this nature which are mounted on automobile vehicles and are designed to permit the actuation without resistance of the pump actuated by the motor of the vehicle during the periods of inactivity of the servo-motors, even though part of the plant may be under pressure.

According to the invention, in the delivery circuit of the pump for liquid, automatic valves are provided, and also a shut-off means combined with a device influenced by the liquid pressure developed in the said circuit, which device may constitute an accumulator of liquid under pressure.

Various examples of application of the invention will be described hereinafter with reference to the accompanying drawing, in which:

Figure 1 diagrammatically shows an installation according to the invention, comprising a hydraulic servo-steering device and a hydraulic servo-brake device.

Fig. 2 is an installation similar to that shown in Figure 1, in which use is made of an accumulator of liquid under pressure.

Figure 3 diagrammatically shows a servo-motor brake installation with accumulator of liquid under pressure.

In the example shown in Figure 1, the installation is provided for use in connection with an automotive vehicle, and comprises a pump 1, which is driven by the motor of the vehicle, and which draws in oil from a tank 2 and delivers it by way of a pipe 3 through the distributor of a servo-motor steering device 4, working by throttling the passage of the liquid for the purpose of developing in the said device the pressure necessary for the actuation of the steering gear of the vehicle. The device 4 may be of any standard construction. On leaving the servo-motor steering device 4 the oil passes through a conduit 5, which comprises a throttling or shut-off device 6, and then flows through a conduit 7 to return to the tank 2.

The pipe 3 communicates with one end of a check valve 13 the other end of which communicates with a pipe 8, leading into a chamber 9 of a cylinder 10. The cylinder 10 is connected to the distributor 11 of a servo-motor braking device 12, working by admitting and exhausting liquid under pressure to and from a motive chamber. A pipe 14 connects the discharge of the distributor 11 of the servo-motor brake to the tank 2.

The cylinder 10 encloses a piston 15, which is provided with a piston rod 16, and which is constantly urged towards the right (as seen in Figure 1) by a calibrated spring 17.

The shut-off member 6 comprises a slide valve 18, provided with a passage 19 and connected to the arm 20 of the pedal 21 for actuating the vehicle brakes through the medium of a spring 22, which bears at one end upon a rod 23 and at the other end upon a rod 24. The arm 25 of the pedal 21 is connected to the mechanism of the servo-motor brake 12 by a rod 26. The conduit 3 is also connected directly to the tank 2 through the medium of a calibrated valve 27, which limits the utilization pressure. The servo-motor steering gear 4 is controlled by a lever 4' from the steering hand-wheel of the vehicle.

The apparatus shown in Figure 1 operates in the following manner: The position of the parts represented in Figure 1 corresponds to the neutral position, that is to say, to a position in which the oil circuit is open, and the pump turns without load. Under these circumstances, the fluid withdrawn from tank 2 by pump 1 is delivered into conduit 3 from where it passes through device 4, conduit 5, bore 19 of valve member 18, conduit 7, casing of valve 27, and back to tank 2.

However, when the brake pedal is depressed, the distributor 11 is acuated through the medium of the rod 26. At the same time the arm 20 of the pedal 21, by means of the rod 24, compresses the spring 22, which transmits a thrust to the rod 23 to push the slide valve 18 towards the right. The slide valve 18, being displaced, interrupts the passage of the oil between the pipes 5 and 7, as a result of which pressure builds up in conduit 3. This pressure opens check valve 13 and through conduit 8 acts upon the piston of the servo-motor brake 12. At the same time this pressure also acts upon the piston 15, compressing the calibrated spring 17 and displacing the slide valve 18 towards the left, thus compressing the spring 22, and re-establishing the circuit between the pump and the oil tank. As soon as communication between conduits 5 and 7 is re-established, the pressure in conduit 3 drops, and check valve 13 closes again due to the pressure in conduit 8. Thus, the pressure established in the servo-motor brake will be maintained, the check valve 13 will remain closed and the brakes will, therefore, remain applied.

In order to release the brakes, the driver permits the pedal 21 to return, thereby allowing an exhaust valve of the distributor 11 to open so that the oil contained in the servo-motor brake may return to the tank 2 through the conduit 14 and the casing of valve 29. At the same time, the rod 24 is returned towards the left into the open position of the slide valve 18. As soon as the brake pedal is depressed again, the oil, being under pressure at the entrance to the servo-motor brake, flows towards the latter owing to the action of the driver upon the pedal 21; the rod 23, and consequently the slide valve 18, moving towards the right, and in so doing closing or throttling the communication 19 under the action of the spring 22, so that the pump can give the desired pressure in the servo-brake. The maximum pressure utilized for the functioning of the servo-brake is therefore limited by the stress in the spring 17. The difference of pressure between that utilized by the servo-brake 12 and that which the pump 1 can give is employed for the functioning of the servo-motor steering gear 4, when the latter functions at the same time as the servo-motor brake. When the servo-motor steering gear is acting alone, that is to say, without the servo-motor brake being in service, the total pressure given by the pump is utilized by the servo-motor steering gear.

The pressure that is established in the auxiliary motor of the servo-motor steering gear 4, at the time of the actuation of the latter, acts equally upon the piston 15 and upon the calibrated valve 27, which limits this pressure to a definite value.

In Figure 2, which shows an installation similar to that of Figure 1, the mechanical regulation of the pressure utilized in the servo-motor brake 12 is replaced by a hydraulic accumulator 28, which automatically regulates to a definite value the pressure of the fluid feeding the servo-motor brake.

In this figure the accumulator 28 is branched upon the pipe 8. It consists of a cylinder 29, a piston 30, a calibrated spring 31, and a slide valve 32, provided with an aperture 33. This slide valve carries at its upper end an abutment 34, which limits its travel downwards. The piping 8' of the distributor 11 of the servo-motor brake 12 is branched on to the piping 8, between the check-valve 13 and the accumulator 28.

In a state of rest, the spring 31 pushes the piston 30, and consequently the slide valve 32, downwards, so as substantially to close the passage 33. As soon as the pump 1 revolves, pressure builds up in conduit 3 due to the interruption of communication between conduits 5 and 7. When this pressure has reached a predetermined value, it opens check valve 13 so that oil is delivered into the conduit 8, and consequently into the cylinder 29 also, thereby bringing about compression of the spring 31 until equilibrium is attained. As a result thereof the slide valve 32 is displaced upwards by the piston 30, in such a way that the passage 33 restores the direct communication between the pipes 5 and 7. At this moment the circuit between the pump and the tank is open, so that the pressure in conduit 3 drops and check valve 13 closes. Consequently, the pump rotates freely without load. Nevertheless the oil or liquid contained in the chamber 29 is still under pressure, under the action of the spring 31, due to the closure of check-valve 13, which prevents the return of the liquid to the tank 2. The oil under pressure contained in the accumulator can therefore serve immediately for actuating the servo-motor brake when the pedal 21 is actuated so as to open the distributor 11. On the other hand the consumption of oil utilized for the servo-motor brake is immediately compensated for in the accumulator by the pump, owing to the fact that the piston 30, in expelling the liquid, carries along with it the slide valve 32, which, in its stroke, throttles or recloses the passage 33, and thus causes the pressure in conduit 3 to rise afresh with subsequent opening of check-valve 13 and transfer of pressure fluid into conduit 8 and chamber 29. This arrangement with accumulator renders it possible still to give one or more brake applications, according to the capacity of the accumulator, even in the event of the pump failing. The operation of the servo-motor brake is effected directly by acting upon the brake pedal. The servo-motor steering gear 4 is brought into action in the usual manner, by acting upon the steering hand-wheel.

The spring accumulator shown in the diagram is given merely by way of example. It will of course be quite understood that any type of accumulator, a compressed-air accumulator for instance, may be utilized.

The installation shown in Figure 3 represents a hydraulic servo-motor brake 12 alone, with hydraulic accumulator 28. The operation of this plant is identical with that described with reference to Figure 2. As soon as the pressure is established in the accumulator 28 the pump 1 turns idly, and therefore without load and without heating the liquid.

What I claim is:

1. In a hydraulic circuit connecting a pressure pump with a first and a second pressure responsive device, said devices being operable independently of each other, the combination of first conduit means normally effecting fluid communication between the pressure side and the suction side of said pump, said conduit means also being adapted to convey actuating fluid to said first pressure responsive device, a control valve member arranged in said first conduit means and movable into a first position to interrupt said fluid communication to thereby cause said pump to build up pressure at its pressure side, a fluid operable motor including a spring loaded piston operable in response to fluid pressure to load said spring and to move said control valve means into a second position for re-establishing the said fluid communication, second conduit means communicating with said fluid motor for conveying pressure fluid to said piston, check-valve means interposed between said second conduit means and said first conduit means and normally preventing communication therebetween, said check-valve means being operable in response to a predetermined pressure in said first conduit means to convey pressure fluid from said first conduit means into said second conduit means, fluid by-pass means hydraulically connected to said pump for by-passing fluid under pressure in excess of said predetermined pressure from the pressure side of said pump to the suction side thereof, third conduit means interconnecting said second conduit means and said second pressure responsive device, fourth conduit means arranged for effecting fluid communication between said second pressure responsive device and the suction side of said pump, and means operatively connected with said second pressure responsive device and operable selectively to bring about fluid communication between said third conduit means and said second pressure responsive device for making the latter effective, or to effect fluid communication between said second pressure responsive device and said fourth conduit means to make said second pressure responsive device ineffective.

2. An arrangement according to claim 1, characterized in that the control valve member is rigidly connected to the piston of said fluid motor.

3. In combination in a hydraulic circuit including a fluid pressure pump and a fluid reservoir therefor, a first conduit connecting the pressure side of said pump to said reservoir, a valve member interposed in said conduit and normally occupying an ineffective position so as to allow the passage of fluid therethrough, a cylinder, a second conduit connecting said cylinder to said first conduit between said pump and said valve member, an automatic check-valve arranged in said second conduit and operable in response to a predetermined pressure in said first conduit to effect fluid communication between said first and said second conduit, a spring-loaded piston arranged in said cylinder for co-operation with said valve member, said piston being fluid operable to move against the thrust of the spring acting on said piston, thereby loading said spring, a hydraulic pressure responsive device hydraulically connected with said second conduit, a distributor for actuating the same, spring means arranged between said lever and said valve member to allow lost motion therebetween, said lever being operable to move said valve member into position for interrupting the passage of fluid therethrough, thereby causing fluid pressure to build up at the pressure side of said pump and causing said piston to move said valve member into its ineffective position in response to said predetermined pressure in said first conduit, a by-pass connecting said pump to said reservoir, and a pressure relief valve in said by-pass for automatically releasing excess pressure from said first conduit in excess of said predetermined pressure.

4. In a hydraulic circuit interconnecting a pressure pump with a first and a second pressure responsive device, the said devices being operable independently of each other, the combination of first conduit means connecting the pressure side of said pump with said first pressure responsive device, second conduit means arranged for connecting the suction side of said pump with said first pressure responsive device, control means mounted in said second conduit means and operable to establish and interrupt fluid communication through said second conduit means between said first pressure responsive device and the suction side of said pump, fluid motor means operable to actuate said control means, third conduit means arranged to convey fluid from said first conduit means to said motor means and said second pressure responsive device, power storage means associated with said motor means for storing power in response to the actuation of said motor means, check valve means interposed between said first and said third conduit means and adapted in response to a predetermined pressure in said first conduit means to allow flow of fluid from said first conduit means into said third conduit means while substantially preventing the flow of fluid in the opposite direction, fourth conduit means arranged for effecting fluid communication between said second pressure responsive device and the suction side of said pump, means operable selectively to effect fluid communication between said third conduit means and said second pressure responsive device for conveying pressure fluid to the latter, or to interrupt said last-mentioned fluid communication and to exhaust said pressure fluid from said second pressure responsive device into said fourth conduit means, and means operable independently of said last mentioned means for actuating said first pressure responsive device.

5. In a hydraulic circuit interconnecting a pressure pump with a first and a second pressure responsive device, said devices being operable independently of each other, the combination of first conduit means connecting the pressure side of said pump with said first pressure responsive device, second conduit means arranged for connecting the suction side of said pump with said first pressure responsive device, a control element mounted in said second conduit means, lever means, yielding means interconnecting said lever means with said control element for selectively effecting interruption of fluid communication between said first pressure responsive device and the suction side of said pump through said second conduit means in response to a predetermined actuation of said lever means, fluid motor means operable to actuate said control element, third conduit means arranged to convey fluid from said first conduit means to said motor means and said second pressure responsive device, power storage means associated with said motor means for storing power in response to the actuation of said motor means, check valve means interposed between said first and said third conduit means and adapted in response to a predetermined pressure in said first conduit means to allow flow of fluid from said first conduit means into said third conduit means while substantially preventing the flow of fluid in the opposite direction, fourth conduit means arranged for effecting fluid communication between said second pressure responsive device and the suction side of said pump, means operable selectively to effect fluid communication between said third conduit means and said second pressure responsive device for conveying pressure fluid to the latter, or to interrupt said last-mentioned fluid communication and to exhaust said pressure fluid from said second pressure responsive device into said fourth conduit means, and means operable independently of said last mentioned means for actuating said first pressure responsive device.

6. In a hydraulic circuit interconnecting a pressure pump with a first and a second pressure responsive device, said devices being operable independently of each other, the combination of first conduit means connecting the pressure side of said pump with said first pressure responsive device, second conduit means arranged for connecting the suction side of said pump with said first pressure responsive device, a control element mounted in said second conduit means, lever means, yielding means interconnecting said lever means with said control element for selectively effecting interruption of fluid communication between said first pressure responsive device and the suction side of said pump through said second conduit means in response to a predetermined actuation of said lever means, fluid motor means operable to actuate said control element, third conduit means arranged to convey fluid from said first conduit means to said motor means and said second pressure responsive device, said motor means including a fluid operable plunger operable to move in a first direction in response to a predetermined pressure in said third conduit means, and also including spring means continuously urging said plunger in a direction opposite to said first direction, check valve means interposed between said first and said third conduit means and adapted in response to a predetermined pressure in said first conduit means to allow flow of fluid from said first conduit means into said third conduit means while substantially preventing the flow of fluid in the opposite direction, fourth conduit means arranged for effecting fluid communication between said second pressure responsive device and the suction side of said pump, means operable selectively to effect fluid communication between said third conduit means and said second pressure responsive device for conveying pressure fluid to the latter, or to interrupt said last-mentioned fluid communication and to exhaust said pressure fluid from said second pressure responsive device into said fourth conduit means, and means operable independently of said last mentioned means for actuating said first pressure responsive device.

7. In a hydraulic circuit including a fluid pressure pump and pressure responsive means, the combination of first conduit means arranged for conveying fluid from the pressure side of said pump to the suction side thereof, control valve means arranged in said first conduit means and normally occupying a position to allow passage of fluid from the pressure side of said pump to the suction side thereof, second conduit means, check valve means interposed between said first conduit means and said second conduit means and arranged to allow the flow of fluid from said first conduit means to said second conduit means in response to a predetermined pressure in said first conduit means while preventing the flow of fluid from said first conduit means to said second conduit means, said second conduit means communicating with said pressure responsive means, fluid operable motor means communicating with said second conduit means and including actuating means operable in response to a predetermined pressure in said second conduit means to move in a first direction to cause said control valve means to interrupt fluid communication between the pressure side of said pump and the suction side thereof through said first conduit means, yielding means associated with said motor means for continuously urging said actuating means in a direction opposite to said first direction, spring means for continuously urging said control valve means into position for effecting communication between the pressure side of said pump and the suction side thereof through said conduit means, control means associated with said pressure responsive means, and lever means mechanically connected to said control means and to said spring means and operable to actuate said last-mentioned control means.

ALBERT DEWANDRE.

REFERENCES CITED

The following references are of record in the file of this patent:

UNITED STATES PATENTS

| Number | Name | Date |
| --- | --- | --- |
| 1,650,338 | Fornaca | Nov. 22, 1927 |
| 1,743,367 | Maybach | Jan. 14, 1930 |
| 1,846,089 | Davis | Feb. 23, 1932 |
| 1,890,010 | Vickers | Dec. 6, 1932 |
| 2,395,671 | Kleinhans et al. | Feb. 26, 1946 |
| 2,438,389 | Edge | Mar. 23, 1948 |